Patented June 11, 1935

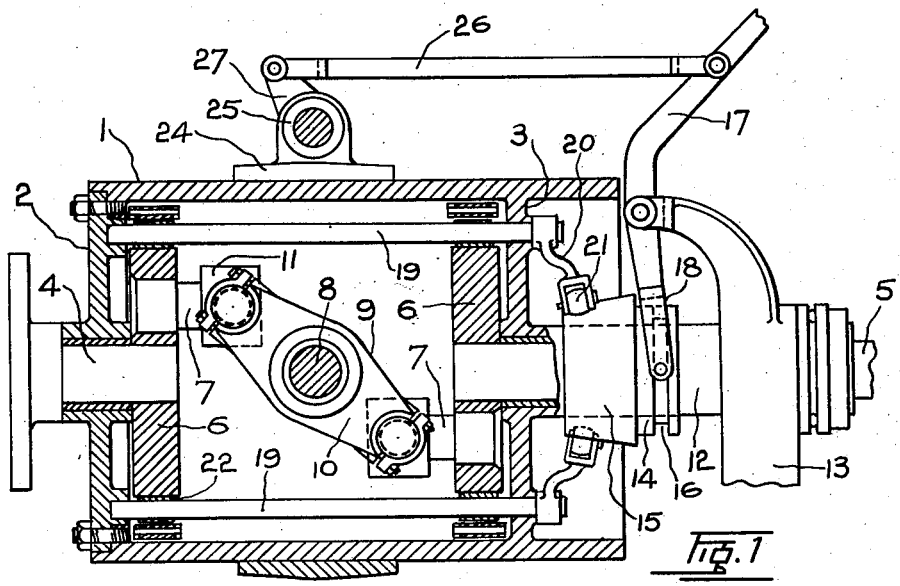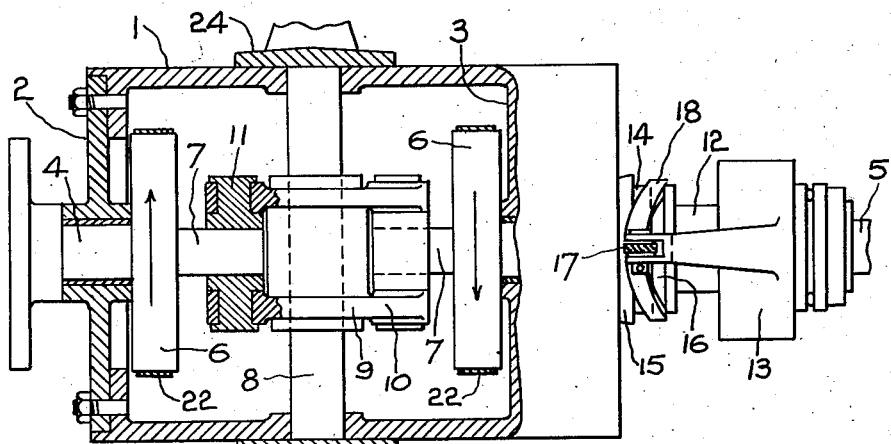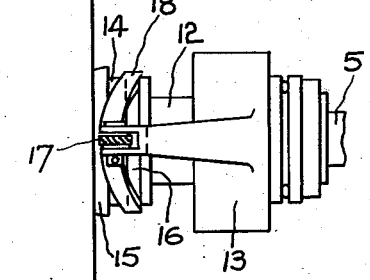

2,004,827

UNITED STATES PATENT OFFICE 2,004,827

REVERSING TRANSMISSION

Floyd P. Quinn, William Horrobin, and William Frank Hawkins, Vancouver, British Columbia, Canada Application July 5, 1934, Serial No. 733,872

3 Claims. (Cl. 74—67)

Our invention relates to improvements in reversing transmissions which are particularly adapted for boat work. The objects are to provide means for reducing wear in a rocker arm type reversing transmission and to provide a construction where greater strength of parts may be provided in a transmission than in those now in general use, and also to provide a simple interior braking system whereby substantial contraction of the brake band may be effected with a small radial movement of the brake lever.

The objects are attained by the combination and arrangement of parts hereinafter described and reference is made to the accompanying drawing, in which:—

Fig. 1 is a longitudinal sectional view of the invention.

Fig. 2 is a longitudinal sectional plan view of the invention.

Fig. 3 is a detail view showing the interior band brake arrangement.

In the drawing like characters of reference indicate corresponding parts in each figure.

The numeral 1 indicates a cylindrical casing having heads 2 and 3 in which are respectively journalled a driving shaft 4 and a driven shaft 5. The shafts 4 and 5 are each fitted with a circular crank disc 6 fitted with a crank pin 7.

Extending along the transverse axis of the casing 1 is a shaft 8 having slidably mounted upon it a rocker 9 which is provided with oppositely arranged pairs of arms 10. Each pair of arms supports a crosshead 11 which slidably engages a crank pin 7.

The head 3 is provided with a boss 12 which is journalled in a suitable bearing 13, and is also fitted with a sleeve 14 forming a cone 15 at one end and a grooved collar 16 at the other. The sleeve is adapted to be given endwise movement through a hand lever 17 having a trunnion fork 18 engaging the collar 16.

Extending longitudinally of the casing 1 is a pair of rocking shafts 19, each fitted at its outer end with a lever 20, the free end of which is provided with a roller 21 engaging the face of the cone 15. These shafts also form anchorages for one end of a brake band 22 and are fitted with cranks 23 which engage the free ends of said brake bands. As the cone 15 is moved in an endwise direction towards the casing, the rollers 21 ride up the taper of said cone, thus swinging the levers 20 and rocking the shafts 19 to apply the brake bands to the periphery of the crank discs.

Fitted about the periphery of the casing 1 is a band brake 24 which is contracted by a suitable cam 25 and is actuated from the lever 17 through a pull rod 26 attached to a crank 27 connected with the cam 25. The brake bands 22 are contracted upon the crank discs to stop them rotating as the band brake 24 is expanded to permit the free rotation of the casing.

In operation, when the band brake 24 is "on" preventing the rotation of the casing 1 and the brake bands 22 are "off" permitting free rotation to the crank discs 6, the driving shaft 4 imparts a rocking and endwise movement to the arms 10 with respect to the transverse shaft 8, thus imparting an opposite rotary motion to the shaft 5.

By virtue of the disposition of the crossheads 11 between pairs of spaced arms 10 and the sliding movement of the crossheads upon the crank pins 7, great strength can be given to the parts without making them unduly heavy and the free sliding movement of the crosshead upon the crank pin is attended with a minimum of wear.

When it is desired to rotate the shaft 5 in the same direction as the shaft 4, the lever 17 is swung over, thus releasing the band brake 24 and contracting the brake bands 22 upon the periphery of the crank discs 6, so that the crank discs are secured non-rotatively in respect to the casing 1 and the drive is directly communicated from the shaft 4 through the casing 1 to the shaft 5. Since the brake to each of the crank discs 6 consists of two bands, each covering substantially one half of the peripheral face of said crank discs, a very slight longitudinal pull is required to be applied to tighten the bands, hence very slight rotation is required to be given to each of the shafts 19.

What we claim as our invention is:

1. In a reversing transmission of the type described, a pair of aligned shafts, a crank to each shaft and a fixed crank pin extending from the crank parallel to the shafts, rocker arms mounted for sliding movement transversely of the axis of the shafts and trunnioned crossheads carried by the rocker arms slidably journalled upon the crank pins.

2. In a reversing transmission, a casing, a pair of shafts aligned in said casing, a crank disk to each shaft, a fixed crank pin extending from each crank disk parallel to the shafts, rocker arms carried by the casing and mounted for movement transversely to the axis of the shafts, said rocker arms being operatively connected to the crank pins, a brake shaft carried within the casing parallel to the first mentioned shafts, a brake band surrounding each crank disk and adapted to be contracted as the brake shaft is rocked, and means exteriorly of the casing for rocking the brake shaft.

3. In a reversing transmission as claimed in claim 2, in which two spaced brake shafts are used and two brake bands to each crank disk, and each band is anchored to one shaft and contractibly connected to the other.

FLOYD P. QUINN.
WILLIAM HORROBIN.
WILLIAM FRANK HAWKINS.